United States Patent
Kundu et al.

(10) Patent No.: US 10,738,138 B2
(45) Date of Patent: Aug. 11, 2020

(54) PARAFFIN INHIBITORS, AND PARAFFIN SUPPRESSANT COMPOSITIONS AND METHODS

(71) Applicant: Ecolab USA Inc., St. Paul, MN (US)

(72) Inventors: Kousik Kundu, Houston, TX (US); Susan Amy Garner, Sugar Land, TX (US); Thomas O. Painter, Rosenberg, TX (US)

(73) Assignee: Ecolab USA Inc., St. Paul, MN (US)

( * ) Notice: Subject to any disclaimer, the term of this patent is extended or adjusted under 35 U.S.C. 154(b) by 44 days.

(21) Appl. No.: 15/718,566

(22) Filed: Sep. 28, 2017

(65) Prior Publication Data

US 2018/0086862 A1 Mar. 29, 2018

Related U.S. Application Data

(60) Provisional application No. 62/401,413, filed on Sep. 29, 2016.

(51) Int. Cl.
 *C08F 8/32* (2006.01)
 *C08F 220/08* (2006.01)
 (Continued)

(52) U.S. Cl.
 CPC .......... *C08F 8/32* (2013.01); *C08F 8/14* (2013.01); *C08F 210/14* (2013.01); *C08F 220/08* (2013.01); *C08F 222/06* (2013.01); *C08F 222/12* (2013.01); *C08F 222/38* (2013.01); *C08F 222/40* (2013.01); *C08L 33/00* (2013.01);
 (Continued)

(58) Field of Classification Search
 None
 See application file for complete search history.

(56) References Cited

U.S. PATENT DOCUMENTS 3,329,658 A 7/1967 Fields
3,527,736 A 9/1970 Averink et al.
(Continued)

FOREIGN PATENT DOCUMENTS

CN 102031101 A 4/2011
CN 102888214 A 1/2013
(Continued)

OTHER PUBLICATIONS

Xu et al., "How comb-type poly(maleic acid alkylamide-co-α-olefin) assemble in waxy oils and improve flowing ability", Asia-Pacific Journal of Chemical Engineering, vol. 4, 2009, pp. 551-556.
(Continued)

*Primary Examiner* — Jeffrey D Washville
(74) *Attorney, Agent, or Firm* — Kagan Binder, PLLC

(57) ABSTRACT

Disclosed are paraffin inhibitors, paraffin suppressant compositions, and methods of making and using them. The paraffin inhibitors comprise polymers of a maleic moiety polymerized with at least two olefins having hydrocarbon chains of a different length from each other. When added to hydrocarbon media such as crude oils to form crude oil compositions, the paraffin inhibitors inhibit the precipitation of paraffin waxes in the crude oil compositions and exhibit reduced precipitation, gelling, and/or crystallization from the hydrocarbon media when the media are subjected to sustained low temperatures.

19 Claims, 1 Drawing Sheet

(51) Int. Cl.
    *C08F 8/14*     (2006.01)
    *C08L 33/00*     (2006.01)
    *F17D 3/12*     (2006.01)
    *C08F 222/12*     (2006.01)
    *C09K 8/524*     (2006.01)
    *C08F 210/14*     (2006.01)
    *C08F 222/40*     (2006.01)
    *C08F 222/38*     (2006.01)
    *C10L 10/16*     (2006.01)
    *C10L 1/196*     (2006.01)
    *C10L 1/222*     (2006.01)
    *C10L 1/14*     (2006.01)
    *C10L 1/236*     (2006.01)
    *C08F 222/06*     (2006.01)
    *C10L 1/185*     (2006.01)
    *C10L 10/14*     (2006.01)
    *C10L 1/24*     (2006.01)
    *C10L 1/198*     (2006.01)
    *C10L 1/2387*     (2006.01)

(52) U.S. Cl.
    CPC .............. *C09K 8/524* (2013.01); *C10L 1/143* (2013.01); *C10L 1/146* (2013.01); *C10L 1/1966* (2013.01); *C10L 1/2225* (2013.01); *C10L 1/2364* (2013.01); *C10L 10/16* (2013.01); *F17D 3/12* (2013.01); *C10L 1/1852* (2013.01); *C10L 1/1985* (2013.01); *C10L 1/236* (2013.01); *C10L 1/2387* (2013.01); *C10L 1/2437* (2013.01); *C10L 10/14* (2013.01); *C10L 2250/04* (2013.01)

(56) References Cited

U.S. PATENT DOCUMENTS

| | | | |
|---|---|---|---|
| 3,682,249 A | 8/1972 | Fischer et al. | |
| 3,776,247 A | 12/1973 | Choufoer et al. | |
| 4,240,916 A | 12/1980 | Rossi | |
| 4,416,668 A | 11/1983 | Thompson | |
| 4,518,509 A | 5/1985 | Newberry | |
| 4,652,611 A | 3/1987 | Kuroda et al. | |
| 4,992,080 A | 2/1991 | Le | |
| 5,055,212 A | 10/1991 | Le | |
| 5,102,558 A | 4/1992 | McDougall et al. | |
| 5,124,059 A | 6/1992 | Koch et al. | |
| 5,177,147 A | 1/1993 | Spenadel et al. | |
| 5,306,437 A | 4/1994 | Heinrichs et al. | |
| 5,851,429 A | 12/1998 | Magyar | |
| 6,010,989 A | 1/2000 | Krull et al. | |
| 6,071,993 A | 6/2000 | Wenderoth et al. | |
| 6,143,043 A * | 11/2000 | Botros ................ | C10L 1/1966 44/346 |
| 6,174,843 B1 * | 1/2001 | Peyton ................ | C10M 145/16 508/468 |
| 6,309,431 B1 | 10/2001 | Becker et al. | |
| 6,322,621 B1 | 11/2001 | Goldman | |
| 6,664,429 B1 | 12/2003 | Huebner et al. | |
| 7,067,599 B2 | 6/2006 | Tack et al. | |
| 7,323,019 B2 | 1/2008 | Krull et al. | |
| 7,541,315 B2 | 6/2009 | Jennings | |
| 7,598,209 B2 | 10/2009 | Kaufman et al. | |
| 7,713,409 B2 | 5/2010 | Feimer | |
| 8,695,707 B2 | 4/2014 | Li et al. | |
| 8,746,341 B2 | 6/2014 | Nguyen et al. | |
| 2002/0066391 A1 | 6/2002 | Goldman | |
| 2002/0166995 A1 | 11/2002 | Robinson et al. | |
| 2004/0087449 A1 | 5/2004 | Furman et al. | |
| 2004/0255511 A1 | 12/2004 | Krull et al. | |
| 2005/0000152 A1 | 1/2005 | Krull et al. | |
| 2005/0028976 A1 | 2/2005 | Nguyen | |
| 2005/0239662 A1 | 10/2005 | Patel | |
| 2006/0166835 A1 | 7/2006 | Yang et al. | |
| 2007/0149417 A1 | 6/2007 | Krull et al. | |
| 2009/0188159 A1 | 7/2009 | Eisenbeis et al. | |
| 2009/0233817 A1 | 9/2009 | Kriegal et al. | |
| 2010/0130385 A1 | 5/2010 | Guzmann et al. | |
| 2010/0180492 A1 | 7/2010 | Krull et al. | |
| 2012/0125620 A1 | 5/2012 | Nguyen et al. | |
| 2012/0234548 A1 | 9/2012 | Dyer | |
| 2012/0318515 A1 | 12/2012 | Cawiezel et al. | |
| 2013/0046048 A1 | 2/2013 | Poelker | |
| 2013/0261033 A1 | 10/2013 | Nguyen | |
| 2014/0027121 A1 | 1/2014 | Jackson et al. | |
| 2014/0051609 A1 | 2/2014 | Southwick et al. | |
| 2014/0190692 A1 | 7/2014 | Hibbeler et al. | |
| 2015/0011453 A1 | 1/2015 | Bennett et al. | |
| 2015/0037202 A1 | 2/2015 | Harrington et al. | |
| 2015/0152329 A1 | 6/2015 | Seetharaman et al. | |
| 2016/0115369 A1 | 4/2016 | Soriano | |

FOREIGN PATENT DOCUMENTS

| | | |
|---|---|---|
| CN | 103666428 A | 3/2014 |
| CN | 104109517 A | 10/2014 |
| EP | 0154177 A2 | 9/1985 |
| EP | 0320766 A2 | 6/1989 |
| WO | 1995010582 A1 | 4/1995 |
| WO | 2000040551 A1 | 7/2000 |
| WO | 2001010993 A1 | 2/2001 |
| WO | 2005085321 A1 | 9/2005 |
| WO | 2008079855 A2 | 7/2008 |

OTHER PUBLICATIONS

Written Opinion and International Search Report for PCT/US2017/053903, dated Dec. 1, 2017 (15 pages).
Written Opinion and International Search Report for PCT/US2017/053901, dated Dec. 1, 2017 (15 pages).

* cited by examiner

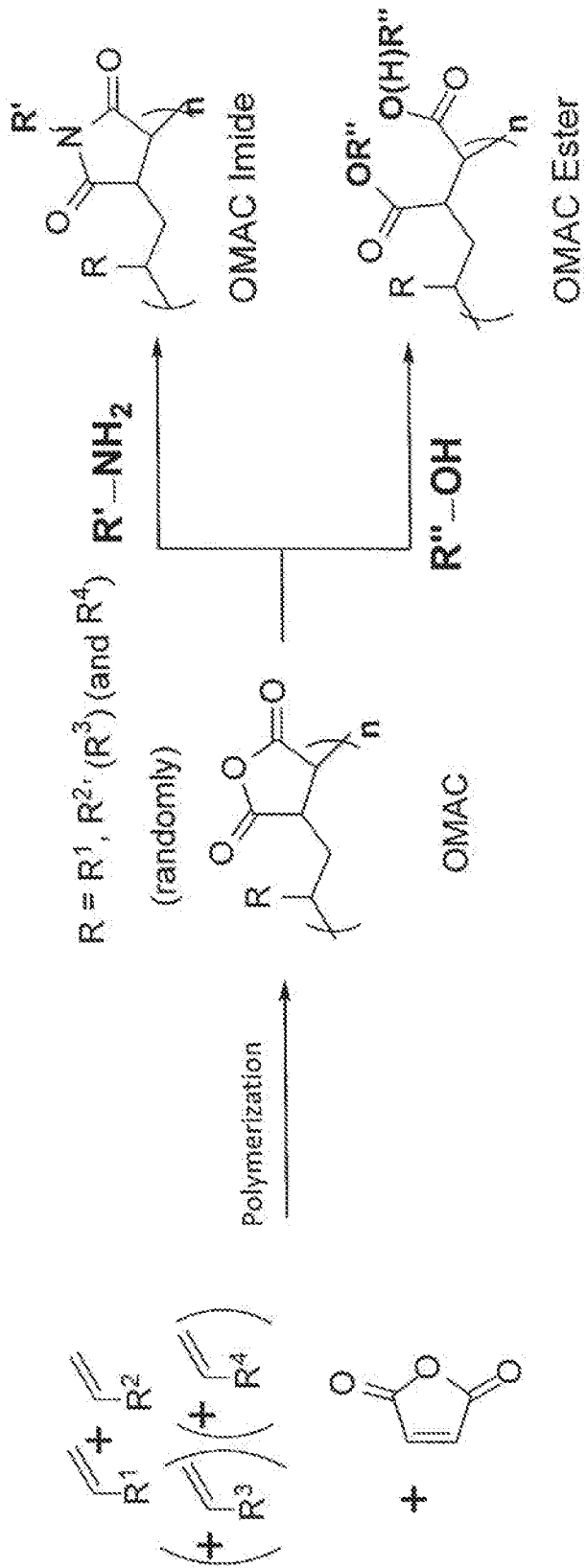

PARAFFIN INHIBITORS, AND PARAFFIN SUPPRESSANT COMPOSITIONS AND METHODS

TECHNICAL FIELD

Crude oil products are globally obtained from subterranean reservoirs using techniques such as drilling and hydraulic fracturing. Transportation of crude oil products from the subterranean reservoir, required to refine or process the crude oil, is accomplished by moving the crude oil through pipes and into storage/transportation means such as rail cars, tanks, and the like. During the moving and/or storage, the crude is often subjected to ambient temperatures between −40° C. and 60° C.

Crude oil products include linear and branched alkanes having the general formula CnH2n+2 wherein n is typically about 1-50, although minor amounts of longer hydrocarbon chains do occur. The higher molecular weight alkanes can be problematic in that their melting points tend to be greater than ambient temperatures in some cases. For example, nonadecane has a melting point of 33° C.; higher alkanes can have melting points in excess of 60° C. for example.

The high melting alkane fractions lead to precipitation of paraffinic residue that solidifies and deposits on the sides and bottoms of pipes, storage vessels, and transportation vessels (rail cars, ocean tankers, etc.). The solidified paraffinic residue, also known as "paraffin wax", not only reduces the effective volume of the structure within which it is contained but also represents a loss of a valuable component from the body of the crude oil. Excessive paraffin wax buildup reduces the efficiency of transporting crude oil and leads to increased costs related to added downtime for cleaning of the pipes and/or vessels as well as disposal of residues removed from the vessel which increase environmental burden. While the pipelines and vessels can be cleaned to remove the paraffinic residue, the process generates hazardous waste, takes the vessel out of service during the cleaning period, and is expensive.

The precipitation of paraffin wax can be reduced by additives, called "paraffin inhibitors" (PI) which interfere with the crystallization process of wax and/or suspend wax crystals in the oil. Examples of some paraffin inhibitor polymers include ethylene polymers and copolymers thereof with vinyl acetate, acrylonitrile, or α-olefins such as octene, butene, propylene, and the like; comb polymers with alkyl side chains such as methacrylate ester copolymers, maleic-olefinic ester copolymers, and maleic-olefinic amide copolymers; and branched copolymers having alkyl side chains such as alkylphenol formaldehyde copolymers and polyethyleneimines.

The precipitation of paraffin wax can also be reduced by additives, called "paraffin dispersants" (PD), which disperse wax and/or paraffin crystals which precipitate in the oil. Many paraffin dispersants are oligomeric or small surfactant molecules. Examples of paraffin dispersants include ethoxylated long-chain alcohols, nonyl-phenol formaldehyde resins, and dodecyl benzene sulfonic acid-amine (DDBSA-amine) salts.

The addition of a paraffin suppressant (a paraffin inhibitor or a paraffin dispersant or both) or a "paraffin suppressant concentrate" (PSC) to the crude oil is effective in preventing the precipitation of and/or dispersing paraffinic residue, thereby reducing such residues in the pipelines and vessels to the benefit of the oil and gas industry. Paraffin suppressant effectively reduces paraffinic residues during storage and transportation of the crude oil products, mitigating economic loss and decreasing environmental impact. A majority of operators in the oil and gas industry employ paraffin suppressants as their primary mode of paraffinic residue control in production pipelines. Non-aqueous formulations including such paraffin suppressant concentrate (PSC) are transported to and stored at the field locations where crude oil is recovered so that it can be applied as needed to pipes, vessels, and the like. Providing PSC in a fluid format—i.e. in solution or dispersion—is highly advantageous for applying a paraffin inhibitor in the field because pumping equipment suitable to meter the desired amount of paraffin inhibitor into a pipe or vessel is readily available.

SUMMARY

Disclosed herein is a paraffin suppressant composition comprising a first polymer, the first polymer comprising the residue of an α-olefin having the formula (I)

wherein $R_1$ is C10-C14 alkyl; an α-olefin having the formula (III)

wherein $R_3$ is C20-C30 alkyl; and an imide having the formula (V)

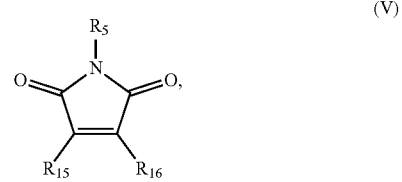

wherein $R_5$ is a C15 to C19 alkyl, and $R_{15}$ and $R_{16}$ are selected from hydrogen and C1 to C50 alkyl wherein at least one of $R_{15}$ and $R_{16}$ are hydrogen. In embodiments, $R_5$ is C18 alkyl. In embodiments, $R_1$ is C12-C14 alkyl.

In embodiments, the first polymer comprises a residue of structure (Va)

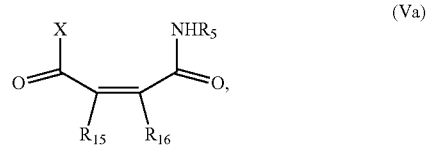

wherein $R_5$, $R_{15}$ and $R_{16}$ are as defined above, and X is —OH or a conjugate base thereof, —NHR$_5$, —N(R$_5$)$_2$, or —OR$_5$. In embodiments, the first polymer includes one or more residues of (V) and excludes residues of (Va). In embodiments, the paraffin inhibitor includes one or more residues of (V) and one or more residues of (Va). In embodiments, the paraffin inhibitor includes one or more residues of (Va) and excludes residues of (V).

In some embodiments, the first polymer further comprises the residue of an α-olefin having the formula (II)

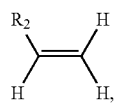
(II)

the residue of an α-olefin having the formula (IV)

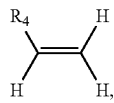
(IV)

or a combination thereof, wherein $R_2$ is C15-C19 alkyl and wherein $R_4$ has 30 carbon atoms or more, for example 30-50 carbons. In embodiments, $R_3$ is C20-C24 alkyl. In embodiments, $R_4$ is C30-C50 alkyl.

Also disclosed herein is a paraffin suppressant composition comprising a second polymer, the second polymer comprising the residue of an α-olefin having the formula (I); the residue of an α-olefin having the formula (II); and the residue of an imide having the formula (V), the residue of a compound having formula (Va), or both. In embodiments, the second polymer includes one or more residues of (V) and excludes residues of (Va). In embodiments, the second polymer includes one or more residues of (V) and one or more residues of (Va). In embodiments, the second polymer includes one or more residues of (Va) and excludes residues of (V).

Also disclosed herein is a paraffin suppressant composition comprising a third polymer, the third polymer comprising the residue of an α-olefin having the formula (I); and the residue of an ester having the formula (VI)

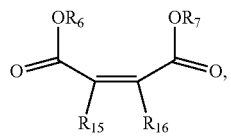
(VI)

wherein $R_6$ is hydrogen or C15 to C50 alkyl, $R_7$ is hydrogen or C15 to C50 alkyl, and $R_{15}$ and $R_{16}$ are as defined above. In some embodiments, the third polymer further comprises the residue of an α-olefin having the formula (II), the residue of an α-olefin having the formula (IV), or a combination of two or more thereof.

Also disclosed herein is a paraffin suppressant composition comprising a fourth polymer, the fourth polymer comprising the residue of an α-olefin having the formula (I); the residue of an α-olefin having the formula (II); and the residue of an ester having the formula (VI). In embodiments, the fourth polymer further comprises the residue of an α-olefin having the formula (IV).

In embodiments, the paraffin suppressant composition comprising the first polymer, the paraffin suppressant composition comprising the second polymer, the paraffin suppressant composition comprising the third polymer, or the paraffin suppressant composition comprising the fourth polymer further comprises an oil-soluble hydrotrope. In embodiments, the oil-soluble hydrotrope is an organic-ammonium salt of an alkylbenzene sulfonic acid, wherein the alkyl of the alkylbenzene sulfonic acid is a C10 to C20 alkyl. In embodiments, the organic-ammonium is selected from primary ammonium, secondary ammonium, tertiary ammonium, or quaternary ammonium. In embodiments, the organic-ammonium is ethanolammonium. In embodiments, the hydrotrope comprises the organic-ammonium salt of the dodecylbenzene sulfonic acid having the formula (VII)

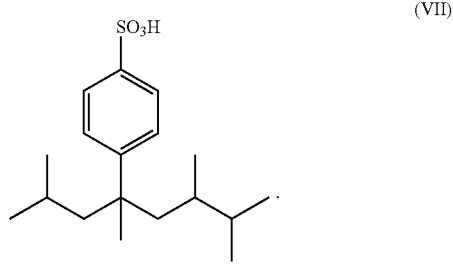 [SMILES: CC(C)CC(C)(CC(C)C(C)C)c1ccc(S(=O)(=O)O)cc1]
(VII)

In embodiments, any of the paraffin suppressant compositions comprising the first polymer, the second polymer, the third polymer, or the fourth polymer comprises a paraffin dispersant selected from a dispersant having the formula (VIII)

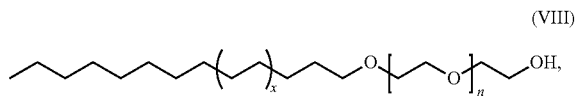
(VIII)

a dispersant having the formula (IX)

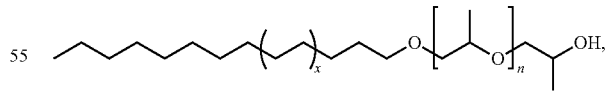
(IX)

a dispersant having the formula (X)

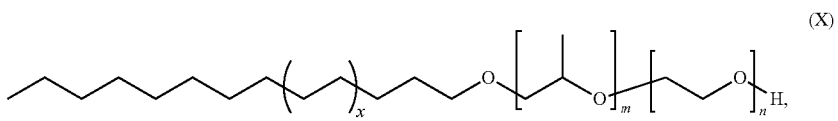
(X)

a dispersant having the formula (XI)

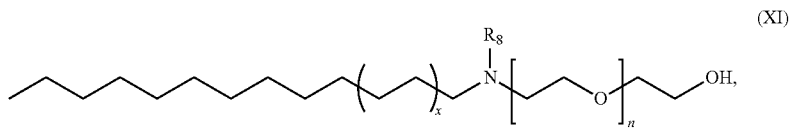

or any combination thereof, wherein x is from 1 to 27, n is from 1 to 100, m is from 1 to 100, and $R_8$ is hydrogen or alkyl.

In embodiments, any of the paraffin suppressant compositions comprising the first polymer, the second polymer, the third polymer, or the fourth polymer comprises a solvent selected from one or more C1-C12 alcohols, C2-C12 diols, C2-C12 glycols, C2-C12 glycol ethers, C3-C12 triols, C5 to C18 linear alkanes, C5 to C18 branched alkanes, C5 to C8 cycloalkanes, benzene, toluene, o-xylene, m-xylene, p-xylene, refined petroleum solvent, or any combination thereof.

Also disclosed are crude oil compositions comprising any of the paraffin suppressant compositions comprising the first polymer, the second polymer, the third polymer, or the fourth polymer and one or more crude oils.

Also disclosed is a method comprising applying any of the paraffin suppressant compositions comprising the first polymer, second polymer, third polymer, or fourth polymer to a composition comprising crude oil to make a paraffin suppressed crude oil composition, and subjecting the paraffin suppressed crude oil composition to a temperature of between 4° C. and −60° C. In embodiments, the method further comprises pumping the paraffin suppressed crude oil composition through a pipe.

Also disclosed are paraffin suppressant concentrates comprising any of the paraffin suppressant compositions comprising the first polymer, the second polymer, the third polymer, or the fourth polymer and a solvent selected from C1-C12 alcohols, C2-C12 diols, C2-C12 glycols, C2-C12 glycol ethers, C3-C12 triols, C5 to C18 linear alkanes, C5 to C18 branched alkanes, C5 to C8 cycloalkanes, benzene, toluene, o-xylene, m-xylene, p-xylene, refined petroleum solvent, or any combination thereof.

Also disclosed are methods comprising subjecting any of the paraffin suppressant concentrates disclosed herein to a temperature of between 4° C. and −60° C.

Also disclosed is a use of any of the paraffin suppressant compositions and/or any of the paraffin suppressant concentrates described herein to inhibit the precipitation of paraffin waxes in crude oil or to disperse crystallized paraffin waxes in the crude oil. In embodiments, the use includes subjecting the crude oil to a temperature of between 4° C. and −60° C.

Additional advantages and novel features of the invention will be set forth in part in the description that follows, and in part will become apparent to those skilled in the art upon examination of the following, or may be learned through routine experimentation upon practice of the invention.

BRIEF DESCRIPTION OF THE DRAWINGS

FIG. 1 shows a reaction scheme for the synthesis of mismatched OMAC imides or mismatched OMAC esters.

DETAILED DESCRIPTION

Although the present disclosure provides references to preferred embodiments, persons skilled in the art will recognize that changes may be made in form and detail without departing from the spirit and scope of the invention. Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Definitions

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "and" and "the" include plural references unless the context clearly dictates otherwise. The present disclosure also contemplates other embodiments "comprising," "consisting of" and "consisting essentially of," the embodiments or elements presented herein, whether explicitly set forth or not.

As used herein, the term "optional" or "optionally" means that the subsequently described event or circumstance may but need not occur, and that the description includes instances where the event or circumstance occurs and instances in which it does not.

As used herein, the term "about" modifying, for example, the quantity of an ingredient in a composition, concentration, volume, process temperature, process time, yield, flow rate, pressure, and like values, and ranges thereof, employed in describing the embodiments of the disclosure, refers to variation in the numerical quantity that can occur, for example, through typical measuring and handling procedures used for making compounds, compositions, concentrates or use formulations; through inadvertent error in these procedures; through differences in the manufacture, source, or purity of starting materials or ingredients used to carry out the methods, and like proximate considerations. The term "about" also encompasses amounts that differ due to aging of a formulation with a particular initial concentration or mixture, and amounts that differ due to mixing or processing a formulation with a particular initial concentration or mixture. Where modified by the term "about" the claims appended hereto include equivalents to these quantities. Further, where "about" is employed to describe a range of values, for example "about 1 to 5" the recitation means "1 to 5" and "about 1 to about 5" and "1 to about 5" and "about 1 to 5" unless specifically limited by context.

As used herein, the term "significant" or "significantly" means at least half, or 50% by some measure as defined or as determined by context. For example, a solution that contains a "significant amount" of a component contains 50% or more of that component by weight, or by volume, or by some other measure as appropriate and in context. A solution wherein a component has been significantly removed has had at least 50% of the original amount of that component removed by weight, or by volume, or by some other measure as appropriate and in context.

As used herein, the word "substantially" modifying, for example, the type or quantity of an ingredient in a composition, a property, a measurable quantity, a method, a position, a value, or a range, employed in describing the embodiments of the disclosure, refers to a variation that does not affect the overall recited composition, property, quantity, method, position, value, or range thereof in a manner that negates an intended composition, property, quantity, method, position, value, or range. Examples of intended properties include, solely by way of nonlimiting examples thereof, flexibility, partition coefficient, rate, solubility, temperature, and the like; intended values include thickness, yield, weight, concentration, and the like. The effect on methods that are modified by "substantially" include the effects caused by variations in type or amount of materials used in a process, variability in machine settings, the effects of ambient conditions on a process, and the like wherein the manner or degree of the effect does not negate one or more intended properties or results; and like proximate considerations. Where modified by the term "substantially" the claims appended hereto include equivalents to these types and amounts of materials.

As used herein, the term "copolymer" means a polymer derived from more than one species of monomer. The term therefore includes polymers of two or more comprising monomer residues and includes terpolymers, quadrapolymers.

As used herein, the term "crude oil" means the unrefined hydrocarbon product of a subterranean reservoir, wherein the product is a liquid at 20° C. at a pressure of about 1 atmosphere, the product including at least linear and branched alkanes having the general formula $C_nH_{2n+2}$ wherein n is typically about 1-50.

As used herein, the term "paraffin suppressant" (PS) means paraffin inhibitor or paraffin dispersant, or a mixture thereof. A paraffin suppressant is an additive for crude oil which is effective for preventing, retarding, delaying, minimizing, reducing, and/or inhibiting paraffin wax precipitation, solidification, or deposition from crude oil and/or is effective for redispersing paraffin wax after such processes. Examples of the effect of paraffin suppressants include preventing the precipitation of paraffin waxes, reducing the precipitation of paraffin waxes, redispersing paraffin waxes into crude oil or crude oil compositions, or removing paraffin waxes from surfaces of containments. In the context of paraffin suppression, paraffin inhibition, or paraffin dispersion, "precipitation of paraffin waxes" means crystallization of paraffin wax so that a solid or semi-solid of paraffin wax precipitates, the growth of a body of solid or semi-solid paraffin wax, or the formation of a gel or other semi-solid of paraffin wax from a substantially liquid oil, crude oil, or crude oil composition. Such precipitates, which include crystals, solids, semi-solids, precipitates, and gels, can attach to surfaces of metal containments, accumulate on surfaces of metal containments, or accumulate in a supernatant crude oil or crude oil composition. In containments such as pipelines, such accumulation can result in blockage of flow of crude oil or crude oil compositions, or at least impedance of flow may result.

As used herein, the term "paraffin suppressant concentrate" (PSC) means a composition comprising one or more paraffin suppressants dissolved, dispersed, or otherwise entrained in a medium such as an organic solvent or mixture of organic solvents at a first concentration, the composition for use as an additive miscible with crude oil to produce a paraffin suppressed oil composition, wherein the oil composition comprises the paraffin suppressant dissolved, dispersed, or otherwise entrained in the paraffin suppressed composition at a second concentration which is lower than the first concentration and wherein at the second concentration the paraffin suppressant is effective for suppressing the presence, accumulation, and/or precipitation of a paraffin wax in the oil composition.

As used herein, the term "paraffin inhibitor" (PI) means a polymeric and/or oligomeric chemical or chemical mixture, wherein the inhibitor retards, delays, minimizes, reduces, inhibits, prevents, or disrupts the precipitation of paraffin wax in crude oil to which it is added.

As used herein, the term "paraffin dispersant" (PD) means a oligomer or short-chain (i.e. non-polymeric) material such as a surfactant, which disperses, dissolves, or otherwise entrains a paraffin wax in crude oil when added to the crude oil.

As used herein, the term "paraffin suppressant composition" means a composition comprising, consisting of, or consisting essentially of a paraffin suppressant.

As used herein, "crude oil composition" means any composition which comprises, consists of, or consists essentially of an oil such as a crude oil. Non-limiting examples of a composition comprising crude oil include crude oil, crude oil plus a paraffin suppressant concentrate, crude oil plus a paraffin suppressant, crude oil plus a paraffin suppressant composition, crude oil plus one or more organic solvents, and crude oil plus one or more additives.

As used herein, "conveying a liquid" means pumping the liquid so that as a result the liquid flows away from a first location towards a second location, transporting the liquid from a first location to a second location, or otherwise enabling or allowing the liquid to pass from a first location to a second location, such as allowing the liquid to flow under the influence of gravity ("gravity feed"). Non-limiting examples of conveying crude oil include pumping crude oil through a pipeline, allowing crude oil to pass through a pipeline under the influence of gravity, transporting crude oil in a railroad tank car from a first location to a second location, and/or transporting crude oil in a road tanker truck from a first location to a second location.

As used herein, the term "crude oil containment" means any object which holds, is designed to hold, or is capable of holding crude oil. Non-limiting examples of crude oil containment include vessels of various types, pipelines, storage tanks, drums, sumps, reservoirs, tank cars, tank trucks, downhole tubing, tubing annuli, as well as devices which can contain crude oil such as gauges, taps, meters, pumps, and valves.

As used herein, the term "crude oil conveyance" means any means and/or object which facilitates the movement of crude oil. Non-limiting examples of crude oil conveyance include pipelines, tank cars, tank trucks, downhole tubing, tubing annuli, as well as devices which facilitate the movement of crude oil such as taps, pumps, and valves.

As used herein, the term "non-aqueous" means substantially excluding water.

As used herein, the term "liquid", "flows", or "flow" referring to a composition of the invention means that 10 mL of the composition vertically at rest on a substantially horizontal surface in a cylindrical container having dimensions of radius 1 inch and height 2 inches flows observably within about 10 seconds when tipped to a substantially horizontal position. In some embodiments, "liquid", "flows", or "flow" referring to a composition of the invention means a composition that has a Brookfield viscosity at 10 s−1 of about 5 cP to 1000 cP.

As used herein, "subjecting" a material "to a temperature of" means "conveying the material to a location wherein the material loses heat and the temperature of the material drops to a temperature of".

As used herein, "hydrocarbon-soluble" means soluble in one or more of C5 to C18 linear alkanes, C5 to C18 branched alkanes, C5 to C8 cycloalkanes, benzene, toluene, o-xylene, m-xylene, p-xylene, and mixtures thereof.

As used herein, "oil-soluble" means soluble in crude oil.

As used herein, "OMAC means" an olefin/maleic anhydride polymer. As used herein, the term includes polymers of olefins and maleic anhydride derivatives such as nadic anhydride, citraconic anhydride, and other related anhydrides known in the art.

As used herein, "OMAC imide" means a polymer of one or more olefins and an N-alkyl, N-aryl, or N-alkaryl maleimide or maleimide derivative. Such polymers may be made by copolymerizing an unsaturated imide with one or more alpha-olefins, or reacting an amine with a copolymer of maleic anhydride (or a derivative thereof) and one or more alpha-olefins.

As used herein, "OMAC ester" means a polymer of one or more olefins and an ester of maleic acid or a maleic acid derivative such as citraconic acid, nadic acid, etc. Such polymers can be made by copolymerizing an unsaturated ester of maleic anhydride (or a derivative thereof) with one or more alpha-olefins or by reacting an alcohol (a hydroxyl-bearing moiety) with a copolymer of maleic anhydride (or a derivative thereof) and one or more alpha-olefins.

As used herein, the term "matched OMAC" means an OMAC polymer of one or more olefins with a maleic anhydride, maleic acid, maleimide, or maleic acid ester or derivatives thereof, wherein the one or more olefin residues have substantially the same or similar side-chain lengths as each other.

As used herein, the term "mismatched OMAC" means an OMAC polymer of two or more olefins with a maleic anhydride, maleic acid, maleimide, or maleic acid ester or derivatives thereof, wherein at least two of the two or more olefin residues in the mismatched OMAC polymer have substantially different side-chain lengths as each other. In embodiments, the side-chains comprise a linear alkyl differing by more than two carbon atoms, in embodiments more than three carbon atoms, in embodiments more than four carbon atoms, in embodiments more than five carbon atoms, in embodiments, more than six carbon atoms, in embodiments, more than seven carbon atoms, in embodiments, more than eight carbon atoms, in embodiments, more than nine carbon atoms, in embodiments, more than ten carbon atoms.

As used herein, the terms "copolymer", "copolymerize" and their derivatives includes not only polymers comprising two monomer residues and polymerization of two different monomers together respectively, but also includes polymers comprising more than two monomer residues and polymerizing together more than two monomers. Therefore as construed herein, the term copolymer, for example, includes terpolymer; quadrapolymer; and polymers made from more than four different monomers, and/or polymers comprising, consisting of, or consisting essentially of more than four different monomer residues.

As used herein, "maleic moieties" includes maleic anhydride, maleic acid, maleic acid esters, maleimide and N-alkyl, N-aryl, and N-alkaryl maleimides. As used herein, "maleic moieties" also includes substituted maleic moieties such as citraconic anhydride, citraconic acid, citraconic acid esters, citraconimide and N-alkyl, N-aryl, and N-alkaryl citraconimides.

Discussion

Typically, paraffin inhibitors are polymeric in nature and are often formulated in non-polar solvents. Some paraffin inhibitors are comb polymers, and have a polymeric backbone with paraffin-like side chains.

The solubility of paraffin inhibitors is temperature dependent. Such paraffin inhibitors when in solution, for example in solvents, crude oil, hydrocarbons and the like, can precipitate, gel, or crystallize, precipitate, or gel from the solution when the solution is subjected to cold temperatures, for example when the oil is conveyed through piping or pipelines subjected to cold ambient temperatures such as experienced in the winter and/or in cold climates. Such paraffin inhibitors, therefore, tend to form gel or eventually solidify with decreasing temperature, and create very costly and/or inconvenient problems by causing pipe blockages, paraffin inhibitor loss, and reduced efficacy of paraffin inhibition, especially in areas where during winter the temperature drops below about 0° F. (about −18° C.) such as mountain areas, Alaska, Canada, parts of the contiguous United States, Europe, Russia, and Asia.

One class of comb polymers which are effective as paraffin inhibitors comprises copolymers of maleic anhydride, maleimide, or esters of maleic acid with olefins. Depending on the structure of the olefin, the olefins can impart side chains to the resulting polymer. Most useful in this respect are olefins with one double bond, since when polymerized olefins comprising one double bond per molecule do not usually form crosslinked networks. If the olefin is linear and/or contains linear hydrocarbon chains such as alkyl or alkaryl chains attached to the double bond, then polymers of the olefin including copolymers of the olefin have pendant side chains. Useful in this respect are polymers of linear α-olefins having 14 carbon atoms or more, because when polymerized and/or copolymerized, they impart linear side chains of 12 carbon atoms or more to the resulting polymer. Examples of such polymers include n-tertradec-1-ene ($C_{12}H_{25}CH=CH_2$). However, also useful are long-chain alkenes, wherein the double bond is not in the 1-position, but is found in other positions of the molecule. Such alkenes are especially useful if when polymerized the resulting polymer comprising the residue of the alkene monomer has linear side chains of at least 12 carbon atoms. Polymers of long chain alkenes with 12 carbon atoms or more on one side of the double bond and 12 carbon atoms or more on the opposing side of the double bond, when polymerized and/or copolymerized, form brush polymers. Such brush polymers have sets of opposing pendant side chains. Brush and comb polymers are both useful in the inventions described herein.

Disclosed herein are copolymers of maleic moieties with two or more olefins, wherein the two or more olefins each furnishes to the resulting copolymer linear hydrocarbon side chains of longer than 10 carbon atoms, the copolymers being effective as paraffin inhibitors when added to crude oil, mixtures of crude oils, crude oil compositions, or other oil compositions. Furthermore, when at least two of linear hydrocarbon side chains differ substantially from each other in length, then the copolymers have a reduced tendency to precipitate from hydrocarbon media such as crude oils when subjected to low temperatures. Differing from each other substantially in length means, for example, differing in length from each other by the length of at least about three C—C single bonds or at least about four —$CH_2$— groups in an n-alkyl chain, in embodiments at least five, in embodiments at least six, in embodiments at least seven, in embodiments at least eight, in embodiments at least nine, in embodiments at least ten —$CH_2$— groups. The copolymers of these embodiments have the desirable property that it exhibits a reduced tendency to precipitate, crystallize, and/or gel when dispersed and/or dissolved in a hydrocarbon medium such as a hydrocarbon solvent and/or a crude oil, mixture of crude oils, or a crude oil composition when the hydrocarbon medium is subjected to cold temperatures. In further embodiments, the maleic moiety itself furnishes a further side chain of more than 10 carbons in length such as n-decyl: such maleic moieties include N-alkyl maleimides, wherein the alkyl group is n-alkyl having 12 carbon atoms or greater; and esters of maleic acid or citraconic acid with 1-undecanoic acid or other straight-chain carboxylic acids having greater than 12 carbon atoms. In one embodiment, the maleic moiety is N-(n-octadecyl) maleimide. In one embodiment, the maleic moiety is an ester of maleic acid and one or more alcohols having greater than 20 carbon atoms.

Therefore, in embodiments there is provided a copolymer having at least three n-alkyl pendant chains having at least 10 carbon atoms, the copolymer comprising the residues of at least one maleic moiety having at least one maleic n-alkyl chain of at least 10 carbon atoms and the residue of at least two olefins comprising olefin n-alkyl chains having at least 10 carbon atoms, wherein at least one of the olefin n-alkyl chains has four more carbon atoms than at least one other of the olefin n-alkyl groups. Each of the residues of the two or more olefins comprises a linear alkyl side-chain of 12 or more carbon atoms. At least two of the residues of the two or more olefins comprising a linear alkyl side-chain of 12 or more carbon atoms two or more olefins comprise linear alkyl side chains having chains each comprising at least 12 carbon atoms, wherein the chain les of In embodiments, the copolymer comprises, consists of, or consists essentially of the residues of one maleic moiety and two olefins. In embodiments, one or both of the two olefins is an α-olefin. In embodiments, the maleic moiety is a maleimide. In embodiments, the maleic moiety is an N-alkyl maleimide, wherein the alkyl group has more than 12 carbon atoms. In embodiments, the alkyl group is n-octadecyl. In embodiments, the maleic moiety is the ester of maleic acid. In embodiments, the ester of maleic acid is the ester of maleic acid with a long-chain carboxylic acid. In embodiments, the long-chain carboxylic acid is a carboxylic acid having 12 carbon atoms or greater. In embodiments, the carboxylic acid is an n-alkyl carboxylic acid having 21 atoms or greater.

Provided herein are mismatched OMAC paraffin inhibitors exhibiting lower tendency to precipitate, gel, or crystallize from hydrocarbon solvents and/or crude oils at low temperatures to which they are added. The paraffin inhibitors inhibit the precipitation, gelling, and/or crystallization of paraffin waxes from oils such as crude oil, crude oil mixtures, and compositions containing them. In addition, the mismatched OMAC paraffin inhibitors advantageously show a reduced tendency to themselves crystallize, precipitate, and/or gel from a hydrocarbon medium such as a crude oil mixture of crude oils, a crude oil composition, and/or a hydrocarbon solvent when the hydrocarbon medium in which they are dissolved and/or dispersed is subjected to a cold temperature, such as occurs when the hydrocarbon medium is contained within a containment, stored within a containment, or moving through a containment that is located in cold weather, underwater, and/or cold climates.

The mismatched OMAC polymers described herein are usefully combined with paraffin dispersants, oil-soluble hydrotropes, and other additives in hydrocarbon media such as crude oil compositions to provide superior low-temperature rheology and phase stability to the hydrocarbon media such as crude oil compositions.

Provided herein are paraffin suppressant compositions which are soluble in, miscible with, or dispersible in hydrocarbon solvents and/or crude oil. In embodiments, the paraffin suppressant compositions comprise a mismatched OMAC paraffin inhibitor. In embodiments, the paraffin inhibitor is a polymer of an N-alkyl maleimide and one or more α-olefins. In embodiments, the suppressant compositions further comprise one or more hydrocarbon solvents. In embodiments, the paraffin suppressant compositions comprise a further solvent selected from alcohols, amides, sulfoxides, aldehydes, ketones, esters, or ethers. In embodiments, the further solvent is alicyclic. In embodiments, the further solvent is acyclic. In embodiments, the further solvent is aromatic. In embodiments, the paraffin suppressant compositions further comprises an additional paraffin dispersant. In embodiments, the paraffin suppressant compositions further comprise a hydrocarbon-soluble hydrotrope. The paraffin suppressant compositions provide improved low temperature stability when added to one or more crude oils or one or more crude oil compositions. When added to a first crude oil composition to make a second crude oil composition, the paraffin suppressant compositions impart to the second crude oil composition improved stability of the crude oil composition when the crude oil composition is subjected to a temperature between 4° C. and −45° C., i.e. the second crude oil composition shows a marked decrease in tendency to exhibit either paraffin wax crystallization or gelling or precipitation of paraffin inhibitor, or both when subjected to temperatures below 4° C. and even as low as −45° C. for between one hour and one year. The paraffin suppressant compositions of the invention inhibit paraffin wax crystallization and/or gelling from the crude oil the compositions containing them and also inhibit precipitation or gelling of the paraffin inhibitor in crude oil compositions that contain such paraffin suppressant compositions at temperatures between 4° C. and −45° C. Further, crude oil compositions comprising the paraffin suppressant compositions of the invention show marked improvements in low-temperature and/or high-pressure rheological behavior, viscosity, and shear behavior.

Provided herein are paraffin suppressant compositions comprising, consisting of, or consisting essentially of one or more mismatched OMAC paraffin inhibitors. In embodiments, the paraffin suppressant compositions further comprise one or more oil-soluble hydrotropes. In embodiments, the oil-soluble hydrotropes are hydrocarbon-soluble hydrotropes. In embodiments, the hydrocarbon-soluble hydrotropes are toluene-soluble hydrotropes. The compositions are added to crude oil, a mixture of crude oils, and compositions comprising one or more crude oils ("crude oil compositions"). The paraffin suppressant compositions lower the temperature at which the oil compositions to which they are added gel, solidify, or become unpumpable when the oil compositions are subjected to cold temperatures.

In embodiments, any of the paraffin suppressant compositions described herein is added to a first oil composition comprising at least one crude oil to form a second oil composition, wherein the second oil composition exhibits reduced precipitation, gelling, or crystallization of paraffin waxes and/or paraffin inhibitors compared with the first oil composition when the oil compositions are subjected to the same cold temperature. In embodiments, the cold temperature is between 4° C. and −60° C.; in embodiments, 4° C. and −55° C.; in embodiments, −30° C. and −50° C.

In embodiments, the invention comprises, consists of, or consists essentially of mixing an OMAC paraffin inhibitor polymer with a first crude oil composition comprising one or more crude oils to make a second crude oil composition; and subjecting the second oil composition to a cold temperature. In embodiments, first crude oil composition and/or the second crude oil composition comprises one or more crude oils and a hydrocarbon-soluble hydrotrope. In embodiments, the first crude oil composition and/or the second crude oil composition comprises an additional paraffin dispersant. In embodiments, the first crude oil composition and/or the second crude oil composition comprises one or more further additives selected from additional paraffin inhibitor, hydrocarbon solvent, other organic solvent, corrosion inhibitor, cleaner, and one or more surfactants. In embodiments, the hydrocarbon-soluble hydrotropes are toluene-soluble hydrotropes. In embodiments, the cold temperature is between 4° C. and −60° C.; in embodiments, 4° C. and −55° C.; in embodiments, −30° C. and −50° C. In embodiments, the one or more hydrotropes increases the solubility of the paraffin and/or the paraffin inhibitor in the oil composition to prevent the gelling, precipitation, or solidification of the paraffin and/or the paraffin inhibitor when the oil composition is subjected to the cold temperature. In embodiments, the pour point and/or the freezing point of the second oil composition is significantly lower than the pour point of the one or more crude oils. In embodiments, the second oil composition comprises, consists of, or consists essentially of one or more crude oils and a paraffin suppressant composition.

First Embodiments

In first embodiments, there is provided a paraffin suppressant composition comprising a paraffin inhibitor polymer, the polymer comprising the residue of an imide having the formula (V)

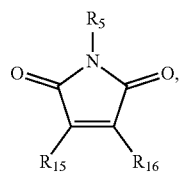

wherein $R_5$ is C15 to C19 alkyl, $R_{15}$ and $R_{16}$ are selected from hydrogen and C1-C50 alkyl wherein at least one of $R_{15}$ and $R_{16}$ is hydrogen; the residue of an α-olefin having the formula (I)

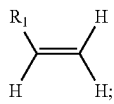

and the residue of an α-olefin having the formula (III)

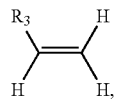

wherein $R_1$ is C10-C14 alkyl and $R_3$ is C20 to C30 alkyl. In embodiments, $R_{15}$ and $R_{16}$ are both hydrogen. In embodiments, $R_{15}$ is hydrogen and $R_{16}$ is methyl. In embodiments, $R_1$, $R_3$, and $R_5$ are individually selected from linear acyclic alkyl, branched acyclic alkyl, alicyclic alkyl, or alkaryl. In embodiments, $R_1$, $R_3$, and $R_5$ are all linear alkyl. In embodiments, $R_5$ is n-octadecyl (n-stearyl). In embodiments, the polymeric paraffin inhibitor further comprises the residue of an α-olefin having the structure (IV)

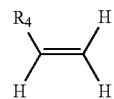

wherein $R_4$ is C30-C50 alkyl. In embodiments, $R_4$ is selected from linear acyclic alkyl, branched acyclic alkyl, alicyclic alkyl, or alkaryl.

In some first embodiments, the paraffin inhibitor polymer comprises a residue of structure (Va)

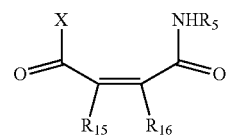

wherein $R_5$ is a C10 to C30 alkyl or alkenyl, $R_{15}$ and $R_{16}$ are selected from hydrogen and C1-050 alkyl wherein at least one of $R_{15}$ and $R_{16}$ is hydrogen, and X is —OH or a conjugate base thereof, —NHR$_5$, —N(R$_5$)$_2$, or —OR$_5$. In some first embodiments, the paraffin inhibitor polymer includes one or more residues of (V) and excludes residues of (Va). In some first embodiments, the paraffin inhibitor polymer includes one or more residues of (V) and one or more residues of (Va). In some first embodiments, the paraffin inhibitor polymer includes one or more residues of (Va) and excludes residues of (V).

In some first embodiments, one or more residues (V), (Va), (I), (III), and/or (IV) of the paraffin inhibitor polymer includes or is two or more residues thereof, for example two residues, three residues, four residues, five residues, six residues, seven residues, eight residues, nine residues, or ten residues thereof.

Second Embodiments

In second embodiments, there is provided a paraffin suppressant composition comprising a paraffin inhibitor polymer, the paraffin inhibitor comprising one or more residues of formula (V), one or more residues of formula (Va), or both; one or more residues of formula (I); and one or more residues of formula (II). In some embodiments, the paraffin inhibitor of the second embodiment further comprises the residue of an α-olefin having the formula (III). In some second embodiments, the polymeric paraffin inhibitor further comprises the residue of an α-olefin having the structure (IV).

In some second embodiments, the paraffin inhibitor polymer comprises the residue of formula (V), (Va), or both; the residue of formula (I); the residue of formula (II); and the residue of formula (III). In some second embodiments, the paraffin inhibitor polymer comprises the residue of formula (V), (Va), or both; the residue of formula (I); the residue of formula (II); and the residue of formula (IV). In some second embodiments, the paraffin inhibitor polymer comprises the residue of formula structure (V), (Va), or both; the residue of formula (I); the residue of formula (II); the residue of formula (III); and the residue of formula (IV).

In some second embodiments, one or more residues (V), (Va), (I), (II), (III), and/or (IV) of the paraffin inhibitor polymer includes or is two or more residues thereof, for example two residues, three residues, four residues, five residues, six residues, seven residues, eight residues, nine residues, or ten residues thereof.

Third Embodiments

In embodiments, there is provided a paraffin suppressant composition comprising a hydrocarbon-soluble hydrotrope; and a paraffin inhibitor comprising the residue of an ester having the formula (VI)

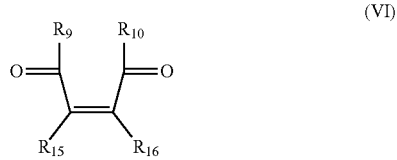

(VI)

wherein $R_9$ is hydrogen or a C15-C50 alkyl group, $R_{10}$ is hydrogen or a C15-C50 alkyl group, and $R_{15}$ and $R_{16}$ are individually selected from hydrogen and C1 to C50 alkyl wherein at least one of $R_{15}$ and $R_{16}$ is hydrogen; the residue of an α-olefin having the formula (I); and the residue of an α-olefin having the formula (II).

In embodiments, $R_{15}$ and $R_{16}$ are both hydrogen. In embodiments, $R_{15}$ is hydrogen and $R_{16}$ is methyl. In embodiments, $R_{15}$ is methyl and $R_{16}$ is hydrogen. In embodiments, $R_{15}$ and $R_{16}$ are both hydrogen. In embodiments, $R_{15}$ is hydrogen and $R_{16}$ is methyl. In embodiments, $R_{15}$ is methyl and $R_{16}$ is hydrogen. In embodiments, the polymeric paraffin inhibitor further comprises the residue of an α-olefin having the structure (IV).

Fourth Embodiments

In fourth embodiments, there is provided a paraffin suppressant composition comprising a hydrocarbon-soluble hydrotrope and a paraffin inhibitor polymer comprising the residue of an ester having formula (VI); the residue of an α-olefin having formula (I); and the residue of an α-olefin having the formula (III). In embodiments, the paraffin inhibitor polymer further comprises the residue of an α-olefin having the formula (II). In embodiments, the paraffin inhibitor polymer further comprises the residue of an α-olefin having the structure (IV).

In some fourth embodiments, the paraffin inhibitor polymer comprises the residue of formula (VI), the residue of formula (I), the residue of formula (II), and the residue of formula (III). In embodiments, the paraffin inhibitor comprises the residue formula (VI), the residue of formula (I), the residue of formula (III), and the residue of formula (IV). In some fourth embodiments, the paraffin inhibitor comprises the residue of formula (VI), the residue of formula (I), the residue of formula (II), the residue of formula (III), and the residue of formula (IV).

First to Fourth Embodiments

In embodiments, any of the paraffin suppressant compositions of the First to Fourth embodiments comprises one or more hydrocarbon solvents selected from C5 to C18 linear alkanes, C5 to C18 branched alkanes, C5 to C8 cycloalkanes, benzene, toluene, o-xylene, m-xylene, p-xylene, and mixtures thereof. In embodiments, the paraffin suppressant composition further comprises one or more additional organic solvents selected from alcohols, amides, sulfoxides, aldehydes, ketones, esters, ethers, or combinations thereof. In embodiments, the one or more additional organic solvents are alicyclic, acyclic, aromatic, or combinations thereof. In embodiments, the one or more additional organic solvents comprise one or more C1-C12 alcohols. In embodiments, the percent by weight of solids in the paraffin inhibitor composition is from about 50% to about 5%. In embodiments, the percent by weight of solids in the paraffin inhibitor composition is from about 40% to about 5%. In embodiments, the percent solids is from about 30% to about 5%, in embodiments from about 25% to about 5%, from about 20% to about 5%, from about 15% to about 5%, or from about 10% to about 5%. In embodiments, the percent by weight of solids in the paraffin inhibitor composition is from about 50% to about 10%. In embodiments, the percent by weight of solids in the paraffin inhibitor composition is from about 40% to about 10%. In embodiments, the percent solids is from about 30% to about 10%, in embodiments from about 25% to about 10%, from about 20% to about 10%, or from about 15% to about 10%.

In embodiments, any of the paraffin suppressant compositions of the First to Fourth embodiments comprises less than 10% water by weight. In embodiments, the paraffin suppressant composition comprises less than 9% water by weight; in embodiments, less than 8%; in embodiments, less than 7%; in embodiments, less than 6%; in embodiments, less than 5%; in embodiments, less than 4%; in embodiments, less than 3%; in embodiments, less than 2%; in embodiments, less than 1% water by weight. In embodiments, the paraffin suppressant composition is substantially non-aqueous.

In embodiments, the number average molecular weight of the paraffin inhibitor of any of the First to Fourth embodiments is from about 1000 to about 1500000, in embodiments about 2000 to about 500000, in embodiments, about 3000 to about 100000, in embodiments about 4000 to about 50000. In embodiments, the number average molecular weight of the paraffin inhibitor is from about 1000 to about 20000, in embodiments about 1000 to about 15000, in embodiments from about 1000 to about 10000.

Fifth Embodiments

In fifth embodiments, there is provided a paraffin suppressant concentrate comprising about 1 wt % to 50 wt % of any one or more of the paraffin suppressant compositions of the First to Fourth Embodiments, and one or more solvents. In embodiments, the concentrate comprises, consists essentially of, or consists of a paraffin suppressant composition of any one of the first to fourth embodiments, and one or more solvents. In embodiments, the one or more solvents comprises, consists of, or consists essentially of one or more hydrocarbon solvents. Advantageously, the paraffin suppressant concentrates exhibit excellent stability when subjected to temperatures between about 4° C. and −45° C., i.e. they show a reduced tendency for the paraffin inhibitor to precipitate, gel, and/or crystallize from the paraffin suppressant concentrate. In embodiments, the paraffin suppressant concentrates are added to one or more crude oils or crude oil compositions to produce a second crude oil composition. In embodiments, a second crude oil composition comprises a first crude oil composition comprising one or more crude oils and a paraffin suppressant concentrate. Advantageously, the second crude oil compositions exhibit improved stability, i.e. they show a reduced tendency for paraffin wax and paraffin inhibitor to precipitate, gel, and/or crystallize from the second crude oil composition when subjected to temperatures of between 4° C. and −45° C.

In embodiments, there is provided a paraffin suppressant concentrate comprising any one or more of the paraffin suppressant compositions described herein and one or more refined petroleum solvents. The one or more refined petroleum solvents comprises, consists essentially of, or consists of aromatic compounds such as benzene, toluene, xylene, light aromatic naphtha, heavy aromatic naphtha, kerosene, or diesel; and/or aliphatic compounds such as pentane, hexane, heptane, octane, nonane, decane, undecane, dodecane, tridecane, tetradecane, pentadecane, hexadecane, or any of their cyclic or branched isomers or a mixture thereof. Naphtha is a petrochemical industry term describing boiling point fractions of petroleum distillate collected at different points on a distillation column. Naphtha fractions may include linear or branched or cyclic alkanes or alkenes, aromatic hydrocarbons, or fused ring aromatic compounds or mixtures of these materials. Light naphtha is lower boiling material collected near the top portion of the distillation column; medium naphtha higher boiling material from near the middle. Heavy naphtha is an even higher boiling material from near the bottom portion of the column.

In embodiments, there is provided a paraffin suppressant concentrate comprising any of the paraffin suppressant compositions described herein; and a solvent selected from C1-C12 alcohols, C5 to C18 linear alkanes, C5 to C18 branched alkanes, C5 to C8 cycloalkanes, benzene, toluene, o-xylene, m-xylene, p-xylene, and mixtures thereof, wherein the paraffin inhibitor is present in the paraffin suppressant concentrate at about 1 wt % to 50 wt %, in embodiments about 2 wt % to 3 wt % or 50 wt % to about 5 wt %. In embodiments, the percent by weight of solids in the paraffin inhibitor composition is from about 40% to about 1%. In embodiments, the percent solids is from about 30% to about 1%, in embodiments from about 25% to about 1%, from about 20% to about 1%, from about 15% to about 1%, or from about 10% to about 1%. In embodiments, the percent by weight of solids in the paraffin inhibitor composition is from about 50% to about 10%. In embodiments, the percent by weight of solids in the paraffin inhibitor composition is from about 40% to about 10%. In embodiments, the percent solids is from about 30% to about 10%, in embodiments from about 25% to about 10%, from about 20% to about 10%, or from about 15% to about 10%.

In embodiments, the paraffin suppressant concentrate is added to a first crude oil composition to make a second crude oil composition, wherein the concentration by weight of the paraffin inhibitor in the second crude oil composition is about 0.5 ppm to 10,000 ppm, about 1 ppm to 10,000 ppm, about 5 ppm to 10,000 ppm, or about 50 ppm to 10,000 ppm. In embodiments, the second crude oil composition further comprises one or more additional additives to accomplish e.g. biocidal activity, corrosion resistance, and the like. The paraffin suppressant compositions and paraffin suppressant concentrates are usefully added to one or more crude oils and/or oil compositions. One crude oil means a crude oil obtained from a particular oil-recovery source or oil-recovery location. More than one crude oil means two or more crude oils, wherein each crude oil is sourced from a different location.

In embodiments, the paraffin suppressant concentrate compositions of the invention are non-aqueous compositions; that is, they are characterized by the substantial absence of water and are formed by substantially excluding water. The paraffin suppressant concentrates of the invention are liquids between about −60° C. to 60° C., or about −50° C. to 60° C., or about −45° C. to 60° C., or about −45° C. to 40° C., or about −40° C. and 60° C., or about −30° C. to 60° C., or about −20° C. to 60° C., or about −10° C. to 60° C., or about 0° C. to 60° C., or about 4° C. to 60° C. By "liquid" it is meant that the paraffin suppressant concentrate compositions of the invention are not observed to contain gel, solid, or semi-solid material.

In embodiments, there is provided any of the paraffin suppressant concentrates described herein, wherein the paraffin suppressant concentrate further comprises one or more additional paraffin inhibitors selected from acrylates, ethylene-vinyl acetate copolymers, graft copolymers of ethylene vinyl acetate, long-chain alkyl phenols, or any combination thereof.

Sixth Embodiments

In sixth embodiments, any of the paraffin suppressant compositions and/or any of the paraffin suppressant concentrates disclosed herein further comprises a hydrocarbon-soluble hydrotrope. In embodiments, the hydrocarbon-soluble hydrotrope is an organic-ammonium salt of an alkylbenzene sulfonic acid having the formula (XII)

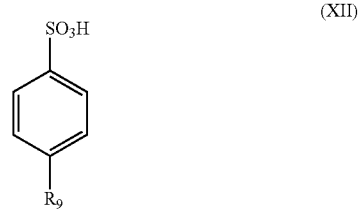

wherein $R_9$ is selected from C10-C50 alkyl, C10-C50 alkaryl, or C10-C50 aryl. In embodiments, $R_9$ is a C10 to C20 alkyl group. In embodiments, $R_9$ is selected from linear or branched alkyl. In embodiments $R_9$ is acyclic. In embodiments $R_9$ is alicyclic. In embodiments, $R_9$ is linear dodecyl. In embodiments, $R_3$ is branched dodecyl.

In embodiments, the hydrocarbon-soluble hydrotrope is an organic-ammonium salt of the dodecylbenzene sulfonic acid having the formula (VII)

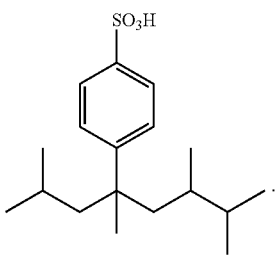

(VII)

In embodiments, the organic-ammonium is selected from primary ammonium, secondary ammonium, tertiary ammonium, or quaternary ammonium. In embodiments, the organic-ammonium has the formula (XIII)

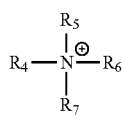

(XIII)

wherein $R_{10}$, $R_{11}$, $R_{12}$, and $R_{13}$ are individually selected from hydrogen, linear alkyl, branched alkyl, alicyclic alkyl having 1 to 10 carbon atoms, aryl, and alkaryl; with the proviso that at least one of $R_4$, $R_5$, $R_6$, and $R_7$ is not hydrogen. In embodiments, the organic-ammonium is ethanolammonium ($H_3N^+CH_2CH_2OH$). In embodiments, $R_4$ is hydrogen, and $R_5$, $R_6$, and $R_7$ are independently selected from hydrogen, ethyl, n-propyl, isopropyl, n-butyl, isobutyl, sec-butyl, and t-butyl, with the proviso that at least one of $R_4$, $R_5$, $R_6$, and $R_7$ is not hydrogen.

In embodiments, the ratio of the paraffin inhibitor to hydrocarbon-soluble hydrotrope by weight in the paraffin suppressant composition is from 7:1 to 1:3. In embodiments, the ratio of the paraffin inhibitor to hydrocarbon-soluble hydrotrope by weight is from 3:1 to 1:3, in embodiments from 6:1 to 1:3, in embodiments from 5:1 to 1:3, in embodiments from 4:1 to 1:3. In embodiments, the ratio of the paraffin inhibitor to hydrocarbon-soluble hydrotrope by weight is from 4:1 to 1:1. In embodiments, the ratio of the paraffin inhibitor to hydrocarbon-soluble hydrotrope by weight is from 4:1 to 2:1.

Seventh Embodiments

In seventh embodiments, any of the paraffin suppressant compositions and/or any of the paraffin suppressant concentrates disclosed herein further comprises additional paraffin dispersant. In some seventh embodiments, the additional paraffin dispersant comprises, consists of, or consists essentially of an alkoxylated alcohol. In some such embodiments, the alkoxylated alcohol is a copolymer of a C1 to C20 alcohol and one or more alkene oxides. In some such embodiments, the one or more alkene oxides is selected from ethylene oxide, propylene oxide, or a combination thereof.

In some seventh embodiments, the additional paraffin dispersant is selected from one or more paraffin dispersants having the formula (VIII)

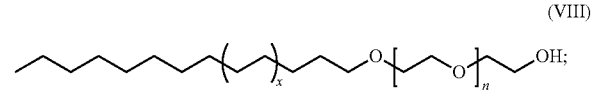

(VIII)

one or more paraffin dispersants having the formula (IX)

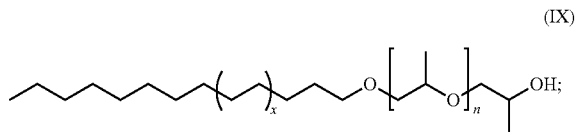

(IX)

one or more paraffin dispersants having the formula (X)

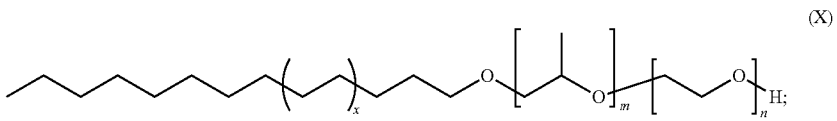

(X)

one or more paraffin dispersants having the formula (XI)

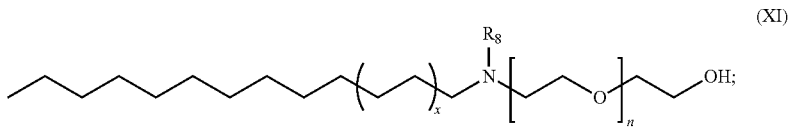

(XI)

one or more paraffin dispersants having the formula (XII)

(XII)

an ethoxylated C1-C20 alcohol; a propoxylated C1-C20 alcohol; a polymer of a C1-C20 alcohol with a random copolymer of ethylene oxide and propylene oxide; a polymer of a C1-C20 alcohol with a block copolymer of ethylene oxide and propylene oxide; or any combination thereof, wherein x is from 1 to 27, n is from 1 to 100, m is from 1 to 100, and $R_8$ is hydrogen or alkyl. In embodiments, x, n, and m are not integers but rather reflect an measured or calculated average value. The one or more paraffin dispersants have a distribution of values of x, a distribution of values of n, and a distribution of values of m, wherein x, n, and m vary independently of each other and vary independently between structures (VIII) to (XII). In embodiments, m and n units of structure (X) are randomly distributed. In other embodiments, m and n units of structure (X) are distributed in one or more blocks. In still other embodiments, m and n units of structure (X) are distributed in an intermediate manner between random and block distribution, which as a term of art is referred to as "blocky" distribution. Thus, the distribution of m and n of structure (X) is suitably random, blocky, or block distribution as selected by the user employing known methods of assembling random, blocky, or block EO/PO units as shown in e.g. formula (X).

The additional paraffin dispersant can be prepared by known techniques, for example reacting an alcohol with ethylene oxide, propylene oxide, or ethylene oxide and propylene oxide in the presence of a base catalyst selected from the hydroxides of alkaline or alkali earth metals or from mixed oxides of magnesium-zinc, magnesium-tin, magnesium-titanium or magnesium-antimony, or acids like sulfuric acid, or Lewis acids like titanium tetrachloride. Random copolymers can be prepared by known techniques, e.g. by the simultaneous combination of ethylene oxide and propylene oxide with catalyst. Similarly, block copolymers can be prepared by known techniques including sequential addition of different alkene oxides to the reaction mixture comprising a catalyst. Non-limiting examples of some alkoxylated alcohol polymers useful as the additional paraffin dispersant are commercially available for example from Elementis Specialties, Inc. of East Windsor, N.J. under the brand name SERDOX®. The synthesis and/or use of similar and/or such polymers is described in US patents U.S. Pat. No. 5,750,796, U.S. Pat. No. 7,335,235, and U.S. Pat. No. 8,524,643, all of which are incorporated herein by reference.

In embodiments, the number average molecular weight of the one or more dispersants having the formula (IV) is from 200 to 10000, in embodiments 500 to 5000, in embodiments 1000 to 4000, in embodiments 1500 to 3000, in embodiments 2000 to 3000. In embodiments, the number average molecular weight of the one or more dispersants having the formula (V) is from 200 to 10000, in embodiments 1000 to 6000, in embodiments 1500 to 4500, in embodiments 1500 to 3500, in embodiments 2000 to 3500. In embodiments, the number average molecular weight of the one or more dispersants having the formula (VI) is from 200 to 20000, in embodiments 1000 to 10000, in embodiments 2000 to 8000, in embodiments 3000 to 7000, in embodiments 4000 to 6000. In embodiments, the number average molecular weight of the one or more dispersants having the formula (VII) is from 200 to 10000, in embodiments 500 to 5000, in embodiments 1000 to 4000, in embodiments 1500 to 3000, in embodiments 2000 to 3000. In embodiments, the number average molecular weight of the one or more dispersants having the formula (VIII) is from 200 to 10000, in embodiments 500 to 8000, in embodiments 1000 to 7000, in embodiments 2000 to 6000, in embodiments 3000 to 5000.

In embodiments, the ratio by weight of the paraffin inhibitor to the additional paraffin dispersant is from 5:1 to 1:1.5; in embodiments 4:1 to 1:1.5; in embodiments, 3:1 to 1:1; in embodiments 2:1 to 1:1, in embodiments about 1.25:1.

Additional Embodiments

In one or more additional embodiments, there is provided a method, the method comprising subjecting any of the paraffin inhibitor concentrates of the first to seventh embodiments, to a temperature of between about −60° C. to 60° C., or about −50° C. to 60° C., or about −45° C. to 60° C., or about −45° C. to 40° C., or about −40° C. and 60° C., or about −30° C. to 60° C., or about −20° C. to 60° C., or about −10° C. to 60° C., or about 0° C. to 60° C., or about 4° C. to 60° C. In embodiments, "subjecting the paraffin inhibitor concentrates to a temperature of" means "adding and/or moving the paraffin inhibitor concentrate to a containment, wherein the temperature of the paraffin decreases until the temperature of the paraffin inhibitor is between a temperature of". In embodiments, the containment is a vessel, a jar, a drum, a can, a tin, a pail with or without lid and liner, a pipe, an umbilical, a capillary string, an annulus, a tank, or a combination thereof. In embodiments, the method further comprises adding any of the paraffin suppressant compositions described herein to a hydrocarbon solvent to make the paraffin suppressant concentrate. In embodiments the subjecting is for one hour to 12 hours. In embodiments, the subjecting is for one hour to one two years. In embodiments, the subjecting is for 12 hours to 24 hours. In embodiments, the subjecting is for 12 hours to 14 days. In embodiments, the subjecting is for 12 hours to one month. In embodiments, the subjecting is for 12 hours to three months. In embodiments, the subjecting is for one day to one year.

In embodiments, the method comprises, consists of, or consists essentially of conveying any of the paraffin concentrates disclosed herein through a containment selected from a pipe, a tank, a pump, a valve, a flowmeter, a pressure gauge, a channel, or combinations thereof, wherein the paraffin suppressant concentrate is in contact with a surface of the containment. In embodiments, conveying comprises, consists of, or consists essentially of pumping, gravity feeding, or combinations thereof. In embodiments, the pipe is a pipeline. In embodiments, the pipe is a capillary string. In embodiments, the pipe is an annulus. In embodiments, the pipe is a cable or hose. In embodiments, the cable is an umbilical cable ("an umbilical"). An umbilical cable is a cable that supplies consumables to an apparatus.

In embodiments, the method comprises, consists of, or consists essentially of subjecting any of the paraffin suppressant concentrates disclosed herein to a cold temperature. In embodiments, the paraffin suppressant concentrate is stored or otherwise located in the containment. In embodiments, the paraffin suppressant concentrate is in contact with a surface of the containment. In embodiments, the paraffin suppressant concentrate is conveyed through the containment. In embodiments, the containment is located in a cold location. In embodiments, the containment contacts a medium. In embodiments, the containment is in thermal contact with a medium. In embodiments, the containment is fully immersed in the medium. In embodiments, the medium is air. In embodiments, the medium is ice. In embodiments, the medium is snow, ice, or a mixture thereof. In embodiments, the medium is aqueous. In embodiments, the medium is water. In embodiments, the medium is seawater. In embodiments, the water is fresh water. In embodiments, the containment is subjected to a first cold ambient temperature from the medium, and the paraffin suppressant concentrate is subjected to a second cold temperature from the containment. In such embodiments, the paraffin suppressant concentrate is in thermal contact with the containment, and the containment is in thermal contact with the medium. In some such embodiments, heat flows from the medium through the containment into the paraffin suppressant concentrate, and the temperature of the paraffin suppressant concentrate rises. In some such embodiments, heat in the paraffin suppressant concentrate flows through the containment and into the medium, and the temperature of the paraffin suppressant concentrate drops. In embodiments, the second cold temperature is substantially the same as the first cold temperature. In embodiments, the second cold temperature is different from the first cold temperature. In embodiments, the second cold temperature is between 4° C. and −100° C. In embodiments, the second cold temperature is between 4° C. and −80° C. In embodiments, the second cold temperature is between 4° C. and −60° C. In embodiments, the second cold temperature is between −10° C. and −60° C. In embodiments, the second cold temperature is between −10° C. and −50° C. In embodiments, the second cold temperature is between −10° C. and −40° C. In embodiments, the second cold temperature is between −20° C. and −40° C. In embodiments, the first cold temperature is the temperature of water surrounding the containment. In embodiments, the containment is submerged underwater. In embodiments the water is seawater. In embodiments, the water is seawater and the containment is located in a submarine location at a depth wherein the water temperature is cold. In embodiments, the submarine location is a deep undersea location. In embodiments, the temperature of the water is from about −2° C. to about 4° C. In embodiments the water temperature is from about 0° C. to about 4° C. In embodiments, the water is fresh water. In embodiments, the fresh water is lake water. In embodiments the subjecting is for one hour to 12 hours. In embodiments, the subjecting is for one hour to one two years. In embodiments, the subjecting is for 12 hours to 24 hours. In embodiments, the subjecting is for 12 hours to 14 days. In embodiments, the subjecting is for 12 hours to one month. In embodiments, the subjecting is for 12 hours to three months. In embodiments, the subjecting is for one day to one year.

In embodiments there is provided a method comprising: applying any of the paraffin suppressant compositions and/or paraffin suppressant concentrates describe herein to a first oil composition to make a second oil composition. In embodiments, the first oil composition comprises, consists of, or consists essentially of a crude oil. In embodiments, the first oil composition comprises, consists of, or consists essentially of a mixture of two or more crude oils. In embodiments, the first oil composition consists of one or more crude oils and one or more additives selected from surfactants, solvents, paraffin inhibitors, paraffin dispersants, corrosion inhibitors, descaling agents, schmoo-removal agents, schmoo inhibitors, one or more other individually selected additives for crude oil known in the art, or any combination thereof. In embodiments, the first oil composition comprises, consists of, or consists essentially of refined oil. In embodiments, the first oil composition comprises, consists of, or consists essentially of hydraulic oil. In embodiments, the first oil composition comprises, consists of, or consists essentially of machine oil.

In embodiments, the method comprises, consists of, or consists essentially of conveying the second oil composition through a containment selected from a pipe, a tank, a pump, a valve, a flowmeter, a pressure gauge, a channel, or combinations thereof, wherein the crude oil is in contact with a surface of the containment. In embodiments, conveying comprises, consists of, or consists essentially of pumping, gravity feeding, or combinations thereof. In embodiments, the pipe is a pipeline. In embodiments, the pipe is a capillary string. In embodiments, the pipe is an annulus. In embodiments, the pipe is a cable or hose. In embodiments, the cable is an umbilical cable ("an umbilical"). An umbilical cable is a cable that supplies consumables to an apparatus.

In embodiments, the second oil composition is subjected to cold temperatures. In embodiments, the second crude oil composition is stored or otherwise located in the containment. In embodiments, the second crude oil composition is in contact with a surface of the containment. In embodiments, the second oil composition is conveyed through the containment. In embodiments, the containment is located in a cold location. In embodiments, the containment contacts a medium. In embodiments, the containment is in thermal contact with a medium. In embodiments, the containment is fully immersed in the medium. In embodiments, the medium is air. In embodiments, the medium is ice. In embodiments, the medium is snow, ice, or a mixture thereof. In embodiments, the medium is aqueous. In embodiments, the medium is water. In embodiments, the medium is seawater. In embodiments, the water is fresh water. In embodiments, the containment is subjected to a first cold ambient temperature from the medium, and the second oil composition is subjected to a second cold temperature from the containment. In such embodiments, the second oil composition is in thermal contact with the containment, and the containment is in thermal contact with the medium. In some such embodiments, heat flows from the medium through the containment into the second oil composition, and the temperature of the second oil composition rises. In some such embodiments, heat in the oil flows through the containment and into the medium, and the temperature of the second oil composition drops. In embodiments, the second cold temperature is substantially the same as the first cold temperature. In embodiments, the second cold temperature is different from the first cold temperature. In embodiments, the second cold temperature is between 4° C. and −100° C. In embodiments, the second cold temperature is between 4° C. and −80° C. In embodiments, the second cold temperature is between 4° C. and −60° C. In embodiments, the second cold temperature is between −10° C. and −60° C. In embodiments, the second cold temperature is between −10° C. and −50° C. In embodiments, the second cold temperature is between −10° C. and −40° C. In embodiments, the second cold temperature is between −20° C. and −40° C. In embodiments, the first cold temperature is the temperature of water surrounding the containment. In embodiments, the containment is submerged underwater. In embodiments the water is seawater. In embodiments, the water is seawater and the containment is located in a submarine location at a depth wherein the water temperature is cold. In embodiments, the submarine location is a deep undersea location. In embodiments, the temperature of the water is from about −2° C. to about 4° C. In embodiments the water temperature is from about 0° C. to about 4° C. In embodiments, the water is fresh water. In embodiments, the fresh water is lake water. In embodiments the subjecting is for one hour to 12 hours. In embodiments, the subjecting is for one hour to one two years. In embodiments, the subjecting is for 12 hours to 24 hours. In embodiments, the subjecting is for 12 hours to 14 days. In embodiments, the subjecting is for 12 hours to one month. In embodiments, the subjecting is for 12 hours to three months. In embodiments, the subjecting is for one day to one year.

In some embodiments, a composition of any of the First to Seventh Embodiments further includes a C4-C50 alkyl phenol-formaldehyde resin. Such materials are available commercially. The alkyl phenol-formaldehyde resins generally have a weight-average molecular weight of about 1,000 g/mol to 500,000 g/mol, for example about 1,000 g/mol to 400,000 g/mol, or about 1000 g/mol to 300,000 g/mol, or about 1000 g/mol to 200,000 g/mol, or about 1000 g/mol to 100,000 g/mol, or about 2000 g/mol to 500,000 g/mol, or about 2000 g/mol to 400,000 g/mol, or about 2000 g/mol to 300,000 g/mol, or about 2000 g/mol to 200,000 g/mol, or about 2000 g/mol to 100,000 g/mol. In embodiments, the polymers have at least about 10 and up to 5000 repeat units, wherein a repeat unit includes the residue of one alkylphenol molecule condensed with one formaldehyde molecule. The alkylphenol monomer residue includes a linear or branched alkyl moiety, bonded to phenol to the phenol hydroxyl, typically though not always in the ortho- or para-position and including 4 to 50 carbon atoms, for example 4 to 40 carbons, or 4 to 30 carbons, or 4 to 20 carbons, or 5 to 18 carbons, or 6 to 16 carbons, or 4, 5, 6, 7, 8, 9, 10, 11, 12, 13, 14, 15, 16, 17, 18, 19, or 20 carbons. The alkylphenol and formaldehyde are subjected to conditions suitable for phenol-formaldehyde condensation, which is accomplished using conventional methods known to those of skill. The polymeric condensation product that results comprises or consists essentially of a phenol formaldehyde polymer with pendant alkyl groups. In some embodiments, the alkylphenol is copolymerized with phenol, resorcinol, one or more additional alkylphenols (that is, a blend of two or more alkylphenols are copolymerized), or a combination of two or more of these.

In embodiments the alkyl phenol-formaldehyde resin is combined with one or more compositions of the First to Seventh Embodiments. Concentrates according to the Fifth Embodiment include in an amount of about 0.1 wt % to 10 wt % alkyl phenol-formaldehyde resin based on the weight of the concentrate, or about 0.5 wt % to 8 wt %, or about 0.5 wt % of 6 wt %, or about 0.5 wt % to 4 wt %, or about 1 wt % to 8 wt %, or about 1 wt % to 7 wt %, or about 1 wt % to 6 wt %, or about 1 wt % to 5 wt %, or about 1 wt % to 4 wt %, or about 2 wt % to 8 wt %, or about 2 wt % to 7 wt %, or about 2 wt % to 6 wt %, or about 2 wt % to 5 wt %, or about 2 wt % to 4 wt %, or about 2 wt % to 3 wt %, or about 3 wt % to 8 wt %, or about 3 wt % to 7 wt %, or about 3 wt % to 6 wt %, or about 3 wt % to 5 wt %, or about 3 wt % to 4 wt % alkyl phenol-formaldehyde resin based on the weight of the concentrate.

The alkyl phenol-formaldehyde resin acts to inhibit precipitation of asphaltenes from crude oil. Asphaltenes are a solubility class of crude oil, defined as the crude oil fraction that is soluble in aromatic solvents and insoluble in n-alkanes. ASTM D-3279-90 defines asphaltenes as solids that precipitate when an excess of n-heptane or pentane is added to a crude oil. Asphaltene molecules have complex structures and may precipitate from crude oil during extraction, forming deposits on the internal surface of the production system and accumulating particularly within equipment with high crude oil residence time. Asphaltenes are typically stable under virgin reservoir conditions, but during production, they can become destabilized and precipitate due to changes in temperature, pressure, with further dependence on the specific chemical composition of the crude oil extracted. Asphaltene deposition interferes with crude oil flow and processing, causing emulsion formation and/or stabilization within the flow, as well as heat exchanger fouling, and the like.

We have found that addition of 0.1 wt % to 10 wt % of one or more alkyl phenol-formaldehyde resins to a concentrate of the Fifth Embodiment provides effective asphaltene inhibition in addition to paraffin inhibition upon applying the concentrate to a first oil to form a second oil. The alkylphenol-formaldehyde resins incorporated into any of the described Fifth Embodiment concentrates do not impart low-temperature instability to the concentrates when stored at a cold temperature. Thus, compositions including the alkylphenol-formaldehyde resins are useful in each and every method described above, in particular methods employing umbilical delivery of a composition or concentrate.

In embodiments, concentrates of the Fifth Embodiments or compositions of any of the First to Seventh Embodiments comprise, consist essentially of, or consist of the following First or Second Mixtures. In embodiments, the methods disclosed above employ the First or Second Mixtures as concentrates. In embodiments, the First or Second Mixtures are employed as paraffin inhibitor/asphaltene inhibitor compositions. In such embodiments, the First or Second Mixtures are employed in a method comprising, consisting essentially of, or consisting of: applying one or both of the First or Second Mixtures to a first oil composition to form a second oil composition as described above.

In embodiments, the First Mixture comprises, consists essentially of, or consists of a C18-C40 alkylphenol formaldehyde resin, a mismatched OMAC, a dispersant of formula (X) above, and one or more solvents. In embodiments, the First Mixture comprises, consists essentially of, or consists of: about 1 wt % to 10 wt % of a C18-C40 alkylphenol formaldehyde resin; about 1 wt % to 10 wt % of a mismatched OMAC; about 1 wt % to 10 wt % of a dispersant having the formula (X) wherein x is 1, the sum of m+n is about 20, and m and n units are randomly distributed in a molar ratio of 1:2; about 1 wt % to 10 wt % 2-methoxy ethanol; and about 80 wt % toluene. In embodiments, the First Mixture consists essentially of or consists of: about 5 wt % of solids of a C18-C40 alkylphenol formaldehyde resin; about 5 wt % of a mismatched OMAC of the First Embodiment comprising the residues of 2 equivalents of C14-C20 maleimide, 1 equivalent of C12-C16 α-olefin, and one equivalent of C20-C24 α-olefin; about 6 wt % 2-methoxy ethanol; about 4 wt % of a dispersant having the formula (X) wherein x is 1, the sum of m+n is about 20, and m and n units are randomly distributed in a molar ratio of 1:2; and about 80 wt % toluene. In embodiments, the C14-C20 maleimide includes a C18 alkyl functionality, a C18 alkenyl functionality, or a mixture thereof.

In embodiments, the Second Mixture comprises, consists essentially of, or consists of a mismatched OMAC, a dispersant of formula (X) above, a hydrocarbon-soluble hydrotrope equivalent, and one or more solvents. In embodiments, the Second Mixture consists essentially of or consists of: about 5 wt % to 20 wt % of a mismatched OMAC, about 2 wt % to 15 wt % of a dispersant having the formula (IX) wherein x is 1, the sum of m+n is about 20, and m and n units are randomly distributed in a molar ratio of 1:2; about 5 wt % to 30 wt % of the ethanolamine salt of formula (VII), which is 4-(1-isobutyl-1,4-dimethylpentyl)-benzenesulfonic acid, and toluene. In embodiments, the Second Mixture consists essentially of or consists of: about 10 wt % of a mismatched OMAC of the First Embodiment comprising the residues of 2 equivalents of C14-C20 maleimide, 1 equivalent of C12-C16 α-olefin, and one equivalent of C20-C24 α-olefin; about 8 wt % of a dispersant having the formula (IX) wherein x is 1, the sum of m+n is about 20, and m and n units are randomly distributed in a molar ratio of 1:2; about 20 wt % of the ethanolamine salt of formula (VII), which is 4-(1-isobutyl-1,4-dimethylpentyl)-benzenesulfonic acid, and about 62 wt % toluene. In embodiments, the C14-C20 maleimide includes a C18 alkyl functionality, a C18 alkenyl functionality, or a mixture thereof.

EXPERIMENTAL SECTION

Example 1

Four polymers were synthesized according to the scheme shown in FIG. 1. The compositions are shown in Table 1. The compositions of the four polymers are shown in Table 1. The procedure to synthesize the four polymers was as follows:

Step 1: Synthesis of OMAC

The first step was the polymerization of an α-olefin with maleic anhydride to produce an OMAC. The α-olefin either having chain length distribution C16-C18 or C20-C24 (1 mol), was charged to the reactor followed by xylene (or heavy aromatic naphtha or kerosene) (~30% by weight of the entire reaction mixture) and maleic anhydride (1.1 mol). The reactor was heated to 80° C. for 30 min while mixing the reactants into a homogenous mixture before raising the temperature to 125° C. The initiator catalyst (t-butyl perbenzoate) initiator was added to and stirred into to the mixture (5.83 g, 0.03 mol). An exotherm of 5-10° C. was observed. Once the temp cooled back to 125° C., additional initiator catalyst (5.83 g, 0.03 mol) was added resulting in a second exotherm. The reaction mixture was heated to 125° C. for 30 min, before increasing the temperature to 135° C. for two hours. Fourier-transform infrared spectroscopy (FTIR) monitoring of the maleic anhydride can be used to check the completion of the reaction.

The second step is the reaction of the maleic anhydride copolymer with either an amine to produce an OMAC imide or an alcohol to produce an OMAC ester.

Step 2a: Synthesis of OMAC Imides

The reactor was charged with the α-olefin maleic anhydride copolymer (OMAC) (~70% actives in xylene) as made in Step 1 followed by hydrogenated tallow amine (1 mol). The mixture was refluxed for four hours using a Dean and Stark trap, and the removal of water was monitored. A molar equivalent of water to hydrogenated tallow amine is expected to be collected and the progress of the reaction can be gauged by the water collected and also by FTIR.

Step 2b: Synthesis of OMAC Esters

A reactor was charged with α-olefin-maleic anhydride copolymer (OMAC) (~70% actives in xylene) as made in Step 1, followed by fatty alcohol (1-2.2 mol). The reaction was heated to 90° C. for one hour before adding 1-5 mol % acid catalyst (e.g. p-toluene sulfonic acid or dodecylbenzenesulfonic acid). The reaction mixture was heated to reflux using a Dean and Stark trap, and the removal of water from the reaction mixture was monitored. A molar equivalent of water to hydrogenated tallow amine is expected to be collected. The progress of the reaction was monitored by FTIR.

TABLE 1

Matched OMAC imide and ester polymers

| (Matched) OMAC Polymer | R | R' (imide) | R" (alcohol) |
|---|---|---|---|
| 1 | $C_{16}$-$C_{18}$ | $C_{18}$ | |
| 2 | $C_{16}$-$C_{18}$ | | $C_{20+}$ |
| 3 | $C_{20}$-$C_{24}$ | $C_{18}$ | |
| 4 | $C_{20}$-$C_{24}$ | | $C_{20+}$ |

Example 2

Eight solutions were made up, the compositions of which are shown in Table 2.

TABLE 2

Paraffin suppressant solutions with matched OMAC polymers. The hydrocarbon-soluble hydrotrope is ethanolammonium dodecylbenzene sulfonate having anion structure (III). The paraffin dispersant of formula (IV) is a copolymer of a C13 alcohol with propylene oxide and ethylene oxide randomly copolymerized.

| Paraffin suppressant solution | Matched OMAC (Polymer 2) | Hydrocarbon-soluble hydrotrope (III) | Additional paraffin dispersant (IV) | Toluene | 1 day/ minus 35° C. | 4 days/ minus 45° C. | 14 days/ minus 45° C. |
|---|---|---|---|---|---|---|---|
| | | % by weight | | | | Cold storage temperature/time | |
| A | 10 | 5 | 8 | 77 | L | L | L |
| B | 10 | 4.5 | 8 | 77.5 | L | L | L |
| C | 10 | 3.75 | 8 | 78.25 | L | L | L |
| D | 10 | 3 | 8 | 79 | G | G | G |
| E | 10 | 2.5 | 8 | 79.5 | G | G | G |
| F | 10 | 5 | 0 | 85 | L | L | G |
| H | 10 | 0 | 0 | 90 | G | G | G |
| J | 10 | 0 | 0 | 90 | S | S | S |

Key:
L = liquid;
G = viscous gel;
and S = solid

Three samples of each of the eight solutions A, B, C, D, E, F, H, and J were subjected to cold storage conditions for a period of time; one sample was stored at −35° C. for one day, a second sample at −45° C. for four days, and the third sample at −45° C. for 14 days. After the period of time, the liquids were removed and visually examined for appearance and pour behavior. The results are included in Table 2, where the liquid remained a liquid (L), the solution had gelled (G), or the solution had solidified (S).

Solidification represents the poorest low-temperature performance, a viscous gel less poor performance, a slight gel indicates improved behavior, and a liquid indicates very good low temperature stability and performance. In every case, the addition of the ethanolammonium dodecylbenzene sulfonate improved the low temperature stability to gelling or solidification of the paraffin suppressant solution. The best results were obtained when the ratio of the matched OMAC imide polymer to the hydrotrope was less than 3.33:1 or less than about 3:1. The addition of the paraffin dispersant having the formula (X) improved the low temperature properties of the paraffin suppressant solutions when compared with the equivalent solutions without the additional dispersant. Without additional paraffin dispersant, some gelling was obtained when the ratio of matched OMAC imide polymer to hydrocarbon-soluble hydrotrope was less than about 2:1 by weight. The matched OMAC by itself without the hydrocarbon-soluble hydrotrope showed relatively poorer low-temperature stability under the test conditions.

Example 3

Seven polymers were synthesized according to the scheme shown in FIG. 1. The compositions are shown in Table 3. Some compositions were synthesized by polymerizing maleic anhydride and two different α-olefin monomers, some with three different α-olefin monomers, and some with all four different α-olefin monomers, as indicated in FIG. 1.

The synthetic method for the mismatched OMAC polymers shown in Table 2 was the same as that of the matched OMAC polymers, except that a mixture of alpha-olefins was used in the OMAC synthesis (Step1). Each alpha-olefin had a distinct chain length distribution ($C_{12-16}$ or $C_{20-24}$ or $C_{24-28}$ or $C_{30+}$). The molar ratios of the monomers are given in Table 3 (R1:R2:R3:R4 column).

TABLE 3

Mismatched OMAC imide and ester polymers

| OMAC Polymer | R1 | R2 | R3 | R4 | R1:R2:R3:R4 | R' (imide) | R" (alcohol) |
|---|---|---|---|---|---|---|---|
| 5 | $C_{12}$-$C_{14}$ | $C_{16}$-$C_{18}$ | $C_{20}$-$C_{24}$ | $C_{30+}$ | 1:1:1:1 | $C_{18}$ | |
| 6 | $C_{12}$-$C_{14}$ | $C_{16}$-$C_{18}$ | $C_{20}$-$C_{24}$ | $C_{30+}$ | 1:1:1:1 | | $C_{20+}$ |
| 7 | $C_{12}$-$C_{14}$ | $C_{16}$-$C_{18}$ | | | 1:1:0:0 | $C_{18}$ | |
| 8 | $C_{12}$-$C_{14}$ | $C_{16}$-$C_{18}$ | | | 1:1:0:0 | | $C_{20+}$ |
| 9 | $C_{12}$-$C_{14}$ | $C_{16}$-$C_{18}$ | $C_{20}$-$C_{24}$ | | 1:1:1:0 | $C_{18}$ | |
| 10 | $C_{12}$-$C_{14}$ | $C_{16}$-$C_{18}$ | | $C_{30+}$ | 1:1:0:1 | $C_{18}$ | |
| 11 | $C_{12}$-$C_{14}$ | | $C_{20}$-$C_{24}$ | | 1:0:1:0 | $C_{18}$ | |

Example 4

Eight solutions were made up, the compositions of which are shown in Table 4. The mismatched OMAC imide polymer was polymer 11 from Table 3.

TABLE 4

Paraffin suppressant solutions with mismatched OMAC polymers

| Paraffin suppressant solution | % by weight | | | | Cold storage temperature/time | | |
|---|---|---|---|---|---|---|---|
| | Mismatched OMAC imide (Polymer 11) | Ethanolammonium dodecylbenzene sulfonate | Additional paraffin dispersant (IV) | Toluene | 1 day/ minus 35° C. | 4 days/ minus 45° C. | 14 days/ minus 45° C. |
| K | 10% | 5 | 8 | 77 | L | L | L |
| M | 10% | 4.5 | 8 | 77.5 | L | L | L |
| N | 10% | 3.75 | 8 | 78.25 | L | L | g |
| O | 10% | 3 | 8 | 79 | L | L | L |
| P | 10% | 2.5 | 8 | 79.5 | L | L | g |
| Q | 10% | 5 | 0 | 85 | L | L | G |
| R | 10% | 0 | 0 | 90 | G | G | G |
| T | 10% | 0 | 0 | 90 | S | S | S |

Key:
L = liquid;
G = viscous gel;
g = slight gelling;
and S = solid

Three samples of each of the eight solutions subjected to cold storage conditions for a period of time; one sample was stored at −35° C. for one day, a second sample at −45° C. for four days, and the third sample at −45° C. for 14 days. After the period of time, the liquids were removed and visually examined for appearance and pour behavior. The results are included in Table 2, where the liquid remained a liquid (L), the solution showed a small degree of gelling (g), the solution had gelled into a viscous gel (G), or the solution had solidified (S).

Solidification represents the poorest low-temperature performance, a viscous gel less poor performance, a slight gel indicates improved performance, and a liquid indicates very good low temperature stability and performance. The mismatched OMAC polymer paraffin inhibitor showed very good low-temperature solution performance compared with the matched OMAC polymer. In every case, the addition of the ethanolammonium dodecylbenzene sulfonate improved the low temperature stability to gelling or solidification of the paraffin suppressant solution, and excellent results were obtained at a wide range of ratios of mismatched OMAC imide polymer to the hydrocarbon-soluble from at least 4:1 to 2:1 (the range of ratios tested). The addition of the paraffin dispersant having the formula (X) improved the low temperature properties of the paraffin suppressant solutions when compared with the equivalent solutions without the additional dispersant. In the absence of any additional paraffin dispersant, gelling was observed after two weeks at −45° C. when the ratio of mismatched OMAC imide polymer to hydrocarbon-soluble hydrotrope was about 2:1 by weight.

The invention illustratively disclosed herein can be suitably practiced in the absence of any element which is not specifically disclosed herein. Additionally each and every embodiment of the invention, as described herein, is intended to be used either alone or in combination with any other embodiment described herein as well as modifications, equivalents, and alternatives thereof. In various embodiments, the invention suitably comprises, consists essentially of, or consists of the elements described herein and claimed according to the claims. It will be recognized that various modifications and changes may be made without following the example embodiments and applications illustrated and described herein, and without departing from the scope of the claims.

The invention claimed is:

1. A composition comprising: an organic-ammonium salt of an alkylbenzene sulfonic acid; and
a polymer, the polymer comprising the residues of
an α-olefin having the formula (I)

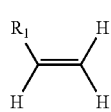

(I)

wherein $R_1$ is C10-C14 alkyl,
an α-olefin selected from formula (II) and formula (III)

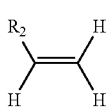

(II)

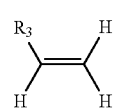

(III)

wherein $R_2$ is C15-C19 alkyl and $R_3$ is C20-C30 alkyl, and
an imide having the formula (V) or a compound having formula (Va) or an ester having formula (VI)

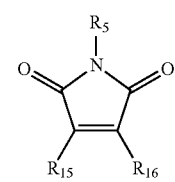

(V)

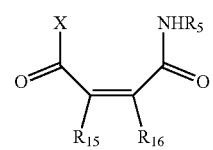

(Va)

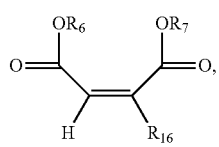

(VI)

wherein $R_5$ is a C15 to C19 alkyl, $R_{15}$ and $R_{16}$ are selected from hydrogen and C1 to C50 alkyl wherein at least one of $R_{15}$ and $R_{16}$ are hydrogen, and $R_6$ and $R_7$ are independently selected from hydrogen or C15 to C50 alkyl.

2. The composition of claim 1, wherein the α-olefin has formula (III) and $R_3$ is C20-C24 alkyl.

3. The composition of claim 1, the polymer further comprising the residue of an α-olefin having formula (IV)

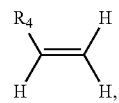

(IV)

wherein $R_4$ is a C30-C50 alkyl.

4. The composition of claim 1, wherein $R_5$ is C18 alkyl.

5. The composition of claim 1, wherein $R_1$ is C12-C14 alkyl.

6. The composition of claim 1, wherein the alkyl of the alkylbenzene sulfonic acid is a C10 to C20 alkyl.

7. The composition of claim 1, the alkylbenzene sulfonic acid having the formula (VII)

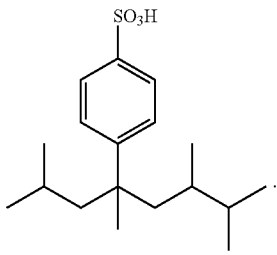

(VII)

8. The composition of claim 7, wherein the organic-ammonium is selected from primary ammonium, secondary ammonium, tertiary ammonium, or quaternary ammonium.

9. The composition of claim 7 wherein the organic-ammonium is ethanolammonium.

10. The composition of claim 1, further comprising a paraffin dispersant selected from a dispersant having the formula (VIII)

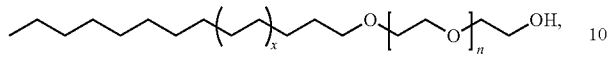

(VIII)

a dispersant having the formula (IX)

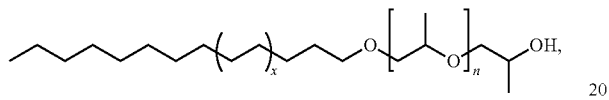

(IX)

a dispersant having the formula (X)

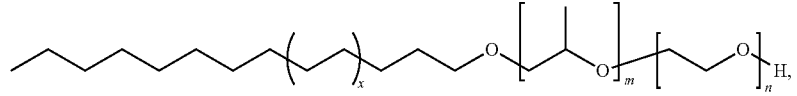

(X)

a dispersant having the formula (XI)

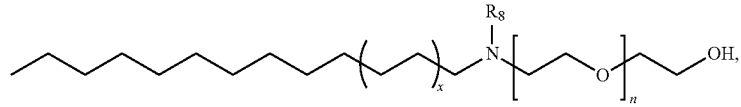

(XI)

or mixtures thereof, wherein x is from 1 to 27, n is from 1 to 100, m is from 1 to 100, and $R_8$ is hydrogen or alkyl.

11. The composition of claim 1, further comprising one or more C1-C12 alcohols, C5 to C18 linear alkanes, C5 to C18 branched alkanes, C5 to C8 cycloalkanes, benzene, toluene, o-xylene, m-xylene, p-xylene, refined petroleum solvent, or a mixture thereof.

12. The composition of claim 1 further comprising a C4-C50 alkyl phenol-formaldehyde resin.

13. A crude oil composition comprising one or more crude oils and about 0.5 ppm to 10,000 ppm of a composition of claim 1.

14. A method comprising applying about 0.5 ppm to 10,000 ppm of a composition claim 1 to a crude oil to make a paraffin suppressed crude oil composition, and subjecting the paraffin suppressed crude oil composition to a temperature of between 4° C. and −60° C.

15. The method of claim 14 further comprising pumping the paraffin suppressed crude oil composition through a pipe.

16. The method of claim 14 wherein the applying is conveying through an umbilical cable.

17. A paraffin suppressant concentrate consisting essentially of:
about 1 wt % to 50 wt % of a composition of claim 1; and
a solvent selected from C1-C12 alcohols, C5 to C18 linear alkanes, C5 to C18 branched alkanes, C5 to C8 cycloalkanes, benzene, toluene, o-xylene, m-xylene, p-xylene, refined petroleum solvent, or mixtures thereof.

18. The composition of claim 1, wherein the polymer comprises the residue of the imide having the formula (V).

19. The composition of claim 1, wherein the polymer consists essentially of the residues of the alpha α-olefin having the formula (I), the α-olefin selected from formula (II) and formula (III), and the imide having the formula (V).

* * * * *